United States Patent [19]

Kishimoto

[11] Patent Number: 4,760,488
[45] Date of Patent: Jul. 26, 1988

[54] TRANSMISSION CONTROL APPARATUS FOR DUPLEX LOOP TYPE TRANSMISSION SYSTEM

[75] Inventor: Kazuo Kishimoto, Amagasaki, Japan

[73] Assignee: Mitsubishi Denki Kabushiki Kaisha, Tokyo, Japan

[21] Appl. No.: 947,919

[22] Filed: Dec. 30, 1986

[30] Foreign Application Priority Data

Jan. 30, 1986 [JP] Japan .................................. 61-16942

[51] Int. Cl.⁴ .............................................. H02H 7/26
[52] U.S. Cl. ........................................ 361/67; 361/59; 361/68; 307/113; 340/825.01; 340/825.05
[58] Field of Search ........................ 361/63, 64, 66–68, 361/81, 49, 59, 69, 70; 307/112, 116, 125, 86, 113; 340/825.16, 825.17, 825.06, 825.03, 825.05, 825.01

[56] References Cited

U.S. PATENT DOCUMENTS 3,970,898  7/1976  Baumann et al. ...................... 361/68
4,596,982  6/1986  Bahr et al. ........................ 340/825.06

OTHER PUBLICATIONS

Tominaga, "Local Area Network Bearing New Age", Electrical Communication Technology News, Jul. 1, 1984, pp. 264, 265.

Primary Examiner—A. D. Pellinen
Assistant Examiner—Todd E. DeBoer
Attorney, Agent, or Firm—Burns, Doane, Swecker & Mathis

[57] ABSTRACT

This invention relates to a duplex loop type transmission system which is so constructed that a plurality of transmission stations are loop-connected with two transmission lines, and the control right for transmission is carried about among the transmission stations. When trouble, such as disconnection on the transmission lines is detected, the station having the control right is adapted to transmit a check signal to the transmission line on which the trouble is detected and the station which receives the check signal returns a response signal to the next station at the side from which the check signal has been transmitted, and the station which receives no response signal carries out a loop back, thereby enabling clearance of the trouble in a short time.

12 Claims, 5 Drawing Sheets

TRANSMISSION CONTROL APPARATUS FOR DUPLEX LOOP TYPE TRANSMISSION SYSTEM

BACKGROUND OF THE INVENTION

1. Field of the Invention

This invention relates to a transmission control apparatus for a duplex loop type transmission system, and more particularly to a transmission control apparatus which is capable of immediately clearing trouble occurring on transmission lines.

2. Description of the Prior Art

FIG. 1 is a schematic view of a duplex loop type transmission system disclosed in the Japanese Patent Laid-Open No. 57-162531 (1982), in which four transmission stations 3a, 3b, 3c and 3d are connected in a loop by means of transmission lines 1 and 2 through which signals flow reversely to each other, the four stations being adapted to sequentially have the control right for the entire system.

FIG. 2 is a block diagram showing constitution of the transmission station and the transmission stations 3a, 3b, 3c and 3d each have the same construction.

In the drawing, reference numeral 3 designates a data transmit-receive control circuit, 5 through 10 designate switching circuits for switching the transmission lines, 11 designates a switching control circuit for the switching circuits 5 through 10, 12a and 12b designate detection circuits of a network switching signal for a local station, 13a and 13b designate delivery circuits for a network switching command to perform the network switching control for other stations, and 14 designates a trouble control circuit which carries out trouble control by a trouble processing demand signal from the data transmit-receive control circuit 3.

Next, explanation will be give on operation of the conventional transmission control apparatus.

As shown in FIG. 1, it is assumed for explanation that the transmission lines 1 and 2 are disconnected at the points X between the transmission stations 3c and 3d, at which time the station 3a has the control right.

The data transmit-receive control circuit 3 at the transmission station 3a detects an occurrence of trouble on the transmission lines due to non-response to the data transmission or a frame error detection by the cyclic check, and then outputs a trouble processing demand 51 with respect to the trouble control circuit 14 at the station 3a, so that the trouble control circuit 14 carries out the loopback control and continuity test of the respective transmission stations 3b through 3d by use of one transmission line 1.

In detail, at first, the network switching command delivery circuit 13a delivers a loopback test command for the transmission line 1 to the transmission station 3b via a switching circuit 15a on the transmission line 1. Then, the transmission station 3b receives the command signal by the detection circuit 12a of the network switching signal for the station 3b and closes the switching circuits 5 and 8 through the switching control circuit 11, thereby making the transmission lines in the system switching condition for the loopback of the transmission line 1. In other words, the signal sent through the transmission line 1 is returned to the transmitting side from the transmission line 2 through the data transmit-receive control circuit 3.

Next, the trouble control circuit 14 at the transmission station 3a delivers a signal to the switching control circuit 11 to close the switching circuits 6 and 7 so as to make the system switching condition for the loopback of the transmission line 2, and a test data delivery signal 52 is delivered to the data transmit-receive control circuit 3 to thereby allow the circuit 3 to transmit the test data to the transmission station 3b.

Then, the test data returns to the station 3a via the switching circuit 5, data transmit-receive control circuit 3, switching circuit 8, and switching circuit 15b interposed in the transmission line 2 at the transmission station 3b.

The test data having thus returned to the transmission station 3a is received by the data transmit-receive control circuit 3 through the switching circuit 6. The data transmit-receive control circuit 3 feeds to the trouble control circuit 14 a reception confirming signal 53 indicating the reception of the test data. The trouble control circuit 14 receives the signal 53 to decide that the transmission lines between the transmission stations 3a and 3b are normal so as to deliver a straight command for the transmission line 1 to the transmission station 3b from the network switching command delivery circuit 13a through the switching circuit 15a. At the transmission station 3b, the command is received by the detection circuit 12a for the network switching signal for the station 3b and the switching circuits 5 and 7 are closed through the switching control circuit 11, thereby making the transmission line 1 switch into a straight condition. In other words, the signal transmitted through the transmission line 1 is returned thereto through the data transmit-receive control circuit 3.

Thus, the loopback control and continuity test for the transmission station 3b is completed and similarly the transmission station 3a carries out control for the transmission stations 3c and 3d. In this case, since the transmission lines are disconnected at the time when the transmission station 3d is subjected to the continuity test, the test data reception confirming signal 53 is not given to the trouble control circuit 14 at the transmission station 3a, whereby abnormality between the transmission stations 3c and 3d is checked by the trouble control circuit 14. Hence, the transmission station 3c is reswitched to the transmission line 1 system loopback, thereby completing the test and the network formation to the transmission line 1.

Next, the loopback control and continuity test of the line 2 for the transmission stations 3d through 3b are carried out from the transmission station 3a with respect to the transmission line 2 in the same way as the line 1. The transmission station 3d, one station before that 3c, where the abnormality has been detected, carries out the loopback of the transmission line 2, so that the portions at the transmission lines 1 and 2 between the transmission stations 3c and 3d are separated from the loop as shown in FIG. 3, thereby forming the closed loop at the respective transmission stations 3c and 3d, thus completing the trouble control.

In addition, in FIG. 2, reference numerals 35 through 40 designate control signals given from the switching control circuit 11 with respect to the switching circuits 5 through 10 respectively.

The conventional transmission control apparatus for duplex loop type transmission system constituted as foregoing, is controlled sequentially, thereby requiring much time to clear the trouble.

SUMMARY OF THE INVENTION

The present invention solves the above-mentioned problem.

A first object of the invention is to provide a transmission control apparatus which allows the transmission station having the control right deliver check signals simultaneously to other stations through the transmission line on which trouble occurs, and response signals with respect to the check signals are adapted to be delivered from the other stations and the adjacent station at the upstream side of the signal flow, so that when no response signal is obtained, the adjacent station closes the loop of the transmission line, thereby enabling the trouble clearing to be quickly completed.

A second object of the invention is to provide a transmission control apparatus in which the transmission station having the control right gives a command and other stations, so that the other stations are put simultaneously in the straight condition as to the transmission lines in the reverse direction to those where the trouble is detected to thereby detect whether the trouble is occurring or not, and thereafter when trouble is not detected, transmission is carried out though the transmission line and when trouble is detected, the check signal as above-mentioned is transmitted and the response signal is received at each transmission station to detect the abnormality, thereby enabling the transmission to be restarted immediately after the detection, thus reducing the time for clearing the trouble.

The above and further objects and features of the invention will more fully be apparent from the following detailed description with accompanying drawings.

DESCRIPTION OF THE PREFERRED EMBODIMENT

Next, a preferred embodiment of a transmission control apparatus of the present invention will be described in accordance with FIG. 4.

Figure 1:
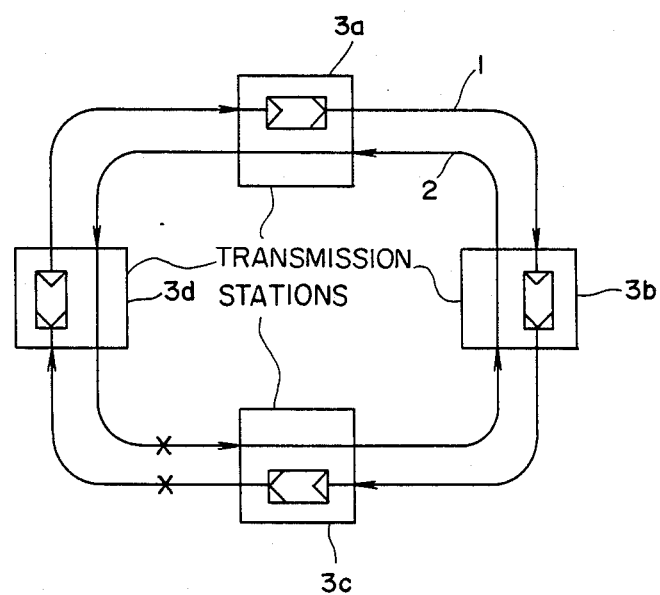
FIG. 1 is a schematic view of a duplex loop type transmission system.
Figure 2:
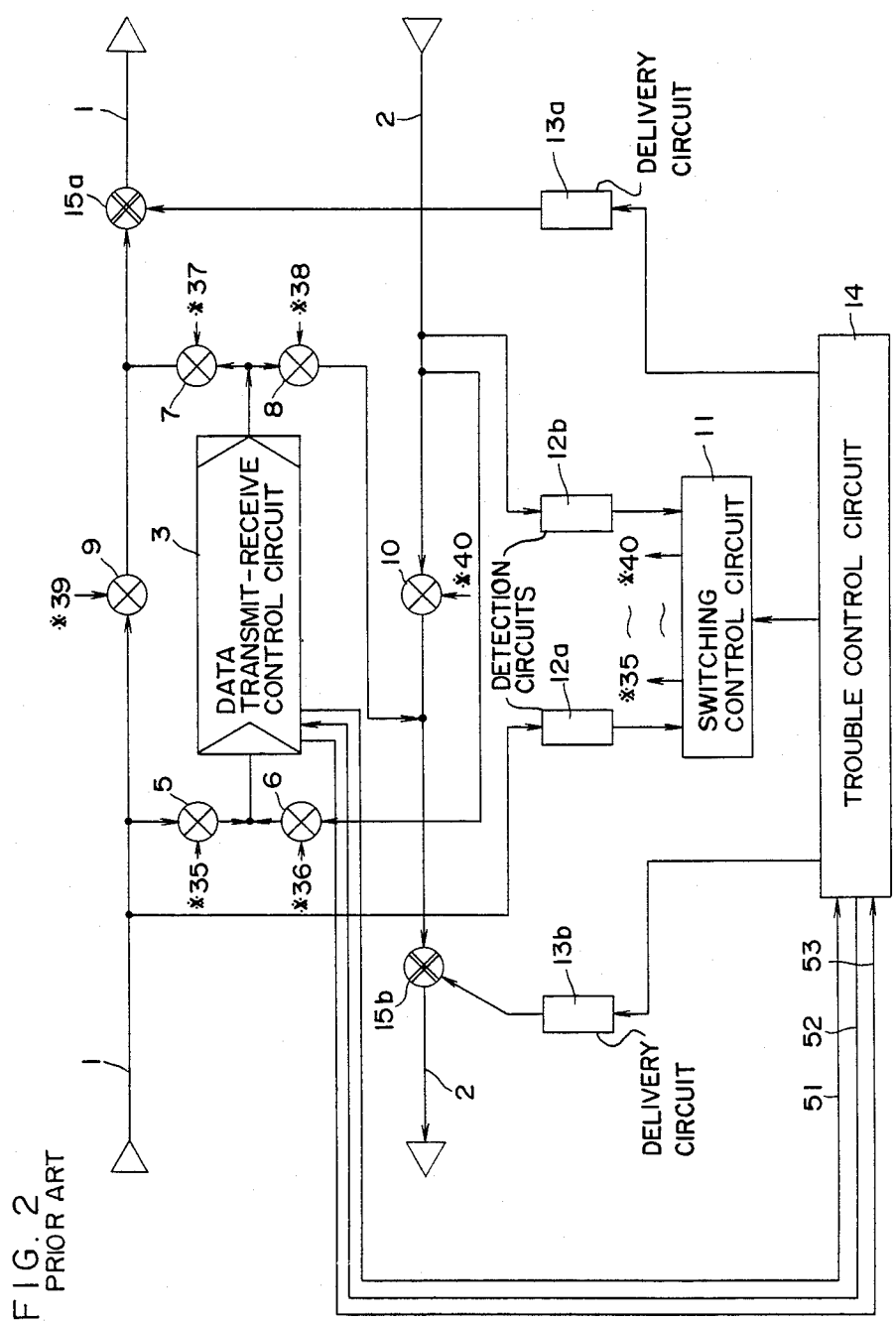
FIG. 2 is a block diagram of the conventional transmission station.
Figure 4:
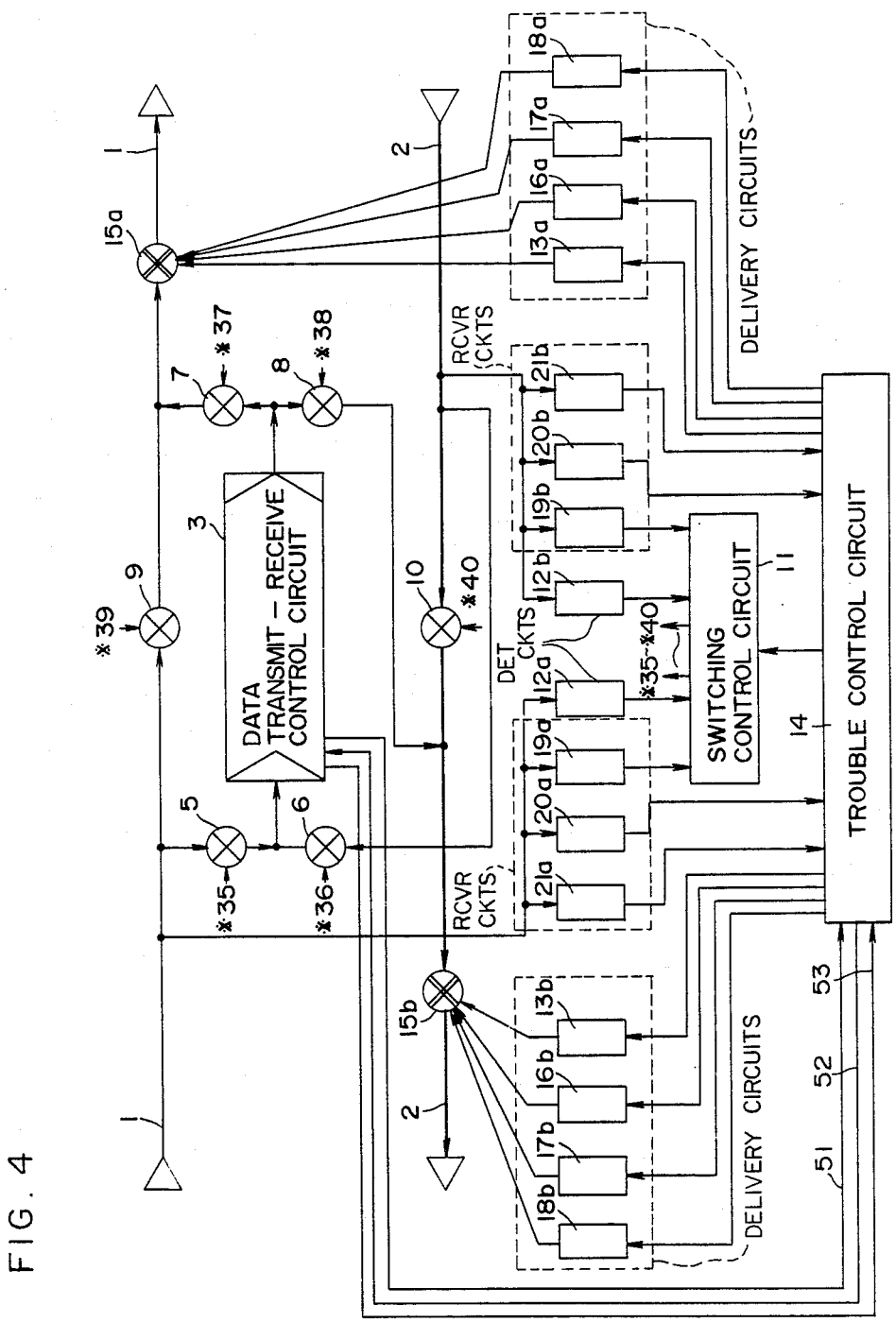
FIG. 4 is a block diagram of a transmission control apparatus of the present invention.

FIG. 4 is a block diagram of the transmission control apparatus of the invention housed in each transmission station 3a, 3b, 3c or 3d at a duplex loop type transmission system in FIG. 1, in which the same components as those in FIG. 2 are designated by the same reference numerals.

In transmission lines 1 and 2 are interposed switching circuits 9, 15a and 10, 15b respectively. A switching circuit 5 is interposed between the node at the upstream side of the signal flow with respect to the switching circuit 9 at the transmission line 1 and a data transmit-receive control circuit 3, a switching circuit 7 between the data transmit-receive circuit 3 and the node at the line 1 between the switching circuits 9 and 15a, a switching circuit 6 between the node at the upstream side of the signal flow with respect to the switching circuit 10 at the transmission line 2 and the data transmit-receive control circuit 3, and a switching circuit 8 between the data transmit-receive control circuit 3 and the node at the line 2 between the switching circuits 10 and 15b, these switching circuits 5 through 10 being given switching control signals 35 through 40 from the switching control circuit 11.

The data tranmit-receive control circuit 3 serves as the center for the transmit-receive control for each transmission station, which delivers to the trouble control circuit 14 a trouble clearing demand 51 when trouble is detected, the trouble control circuit 14 receiving the demand 51 to perform the control to be described hereinafter.

The trouble control circuit 14, when its station has the control right, delivers the simultaneous system switching commands to the transmission lines 1 and 2 through delivery circuits 16a and 16b and switching circuits 15a and 15b. For the station having no control right, the command is received by the switching control circuit 11 thereof from the transmission lines 1 and 2 through receiver circuits 19a and 19b.

Also, the trouble control circuit 14, when the station thereof has the control right, delivers simultaneous check signals for the adjacent stations to the transmission lines 1 and 2 through delivery circuits 17a and 17b and the switching circuits 15a and 15b. For the station having no control right, the check signal is received by the trouble control circuit 14 from the transmission lines 1 and 2 through receiver circuits 20a and 20b. The trouble control circuit 14 at the station receiving the check signal outputs the response signal to the adjacent station at the upstream side of the signal flow, the response signal being sent out to the transmission lines 1 and 2 through the delivery circuits 18a and 18b and switching circuits 15a and 15b. The response signal thus delivered is introduced into the trouble control circuit 14 from the transmission lines 1 and 2 through receiver circuits 21a and 21b.

Figure 5:
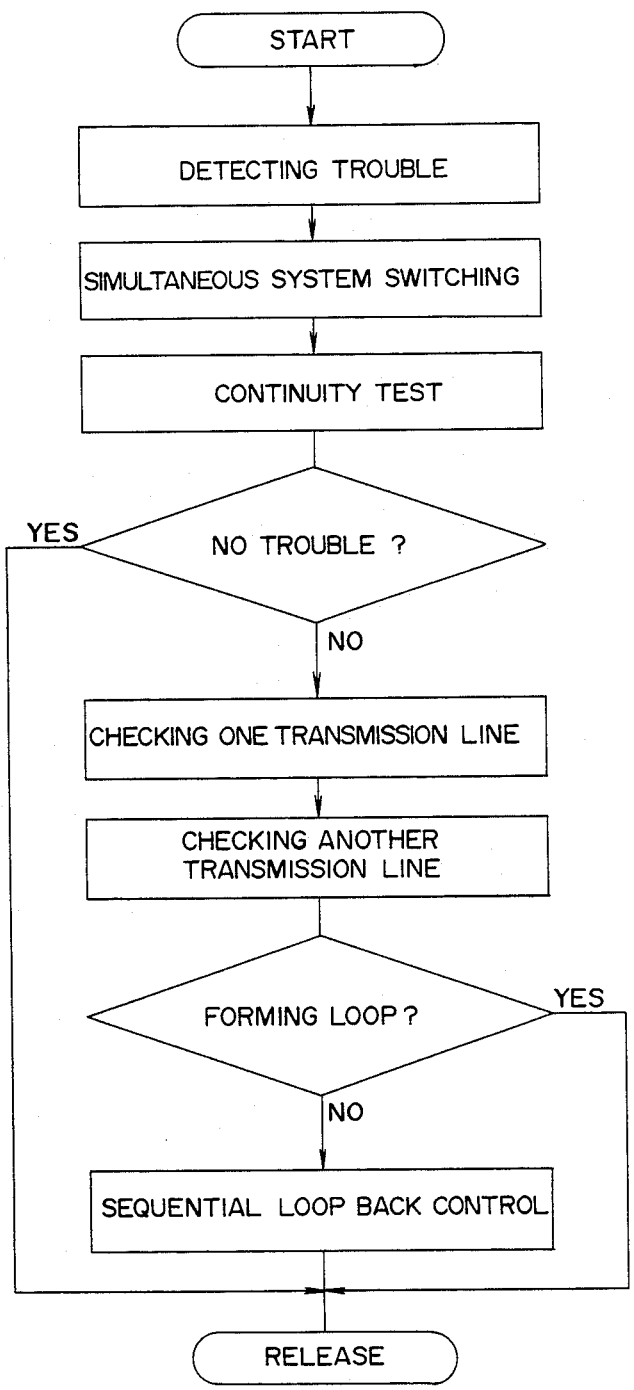
FIG. 5 is a flow chart of operation of the transmission control apparatus of the present invention.

Next, the operation of the apparatus of the present invention constructed as described above will be described in accordance with a flow chart in FIG. 5.

In the following case both the transmission lines 1 and 2 are disconnected between the transmission stations 3c and 3d in the same way as the conventional example, assuming that the transmission station 3a has the control right.

The data transmit-receive control circuit 3 at the station 3a detects trouble by non-response to the data transmission, detection of frame error due to the cyclic check and the like. Now, assuming that the trouble detection is carried out regarding the transmission line 1, the data transmit-receive control circuit 3 gives the trouble control circuit 14 the trouble clearing demand 51 to command inspection of the transmission line 2. The trouble control circuit 14 at the transmission station 3a receives the demand 51 and delivers to the transmission line 2 through the delivery circuit 16b and switching circuit 15b the simultaneous system switching command to make the line 2 straight. Other stations receive the command by the switching control circuit 11 through the receiver circuit 19b and close the switching circuits 6 and 8, thereby putting the transmission line 2 in the straight condition.

Next, the trouble control circuit 14 at the transmission station 3a gives a test data sending signal 52 to the data transmit-receive control circuit 3 to deliver therefrom the test data to carry out a continuity test. When the test data is received by the data transmit-receive control circuit 3 after passing through the transmission line 2, the data transmit-receive control circuit 3 is to deliver a reception confirming signal 53 to the trouble control circuit 14, thereafter transmission is carried out through only the transmission line 2. Since the transmission line 2 is also disconnected in this example, the data transmit-receive control circuit 3 gives the trouble clearing demand 51 again to the trouble control circuit 14.

The trouble control circuit 14 receives the demand 51 to deliver the simultaneous adjacent station check signals to the transmission line 1 through the delivery circuit 17a and switching circuit 15a, at which time the transmission line 1 is kept straight, whereby a trouble control circuit 14 at the transmission station connecting with the normal line receives the check signal through a receiver circuit 20a and delivers a response signal to the adjacent station at the upstream side of the signal flow. For example, trouble control circuits 14 at the transmission stations 3b and 3c each deliver the response signals to the transmission line 2 through a delivery circuit 18b and a switching circuit 15b, resulting in the respective transmission stations 3a and 3b for the transmission line 1 and adjacent to stations 3b and 3c at the upstream sides of the signal flow receive the response signals through the receiver circuit 21b. The stations having obtained the response signals finish the control as to the transmission line 1 respectively.

The transmission station 3d receives no check signal because of disconnection of the transmission line 1, whereby the transmission station 3c receives no response signal. Hence, in such stations, the trouble control circuit 14 gives the predetermined signal to the switching control circuit 11 and closes the switching circuits 5 and 8, thereby putting the stations 3c and 3d in the loopback condition respectively.

Figure 3:
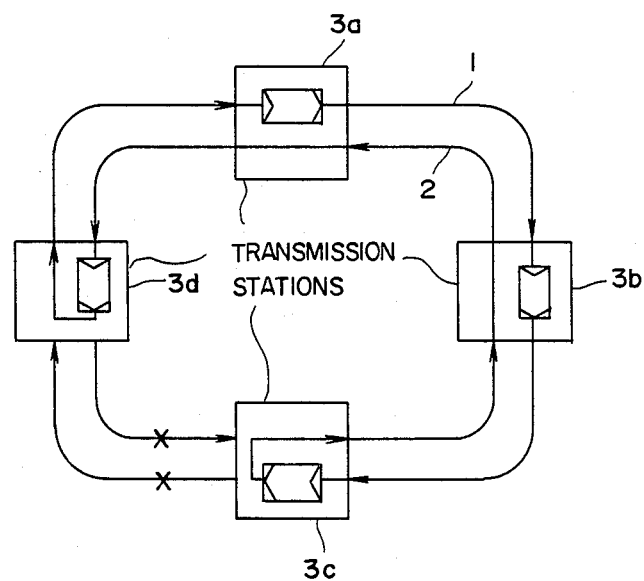
FIG. 3 is a schematic view of the system as same as FIG. 1 after being cleared of trouble.

After the above control, the transmission line 2 is subjected to control being the same as above-mentioned, whereby the transmission station 3d in this embodiment is put into the loopback condition to thereby obtain the condition shown in FIG. 3.

In addition, after the completion of the loopback, the continuity test being the same as the conventional test, may be performed.

Also, when the transmission station 3a having the control right cannot receive the response signal from either transmission line 1 or 2, the transmission lines are not put into the loopback condition, so that the detection circuits 12a and 12b for the network switching signal for the local station and network switching command delivery circuits 13a and 13b at the station 3a are used to carry out the sequential loopback control in the conventional manner.

As seen from the above, the present invention simultaneously carries out the loopback control, so that trouble clearing at high speed is realized, whereby the communication-off time is very short. In a case different from the above example, wherein the trouble occurs only on the transmission line in use, it is immediately apparent that the other line is normal before application of the loopback control, so that the transmission must be carried out immediately, thereby enabling the trouble clearing to be carried out at high speed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents thereof are therefore intended to be embraced by the claims.

What is claimed is:

1. A transmission control apparatus in a duplex loop type transmission system in which a plurality of transmission stations are loop-connected with two transmission lines and a control right for transmission is passed among each of said transmission stations, comprising:
   a circuit which, when one of said stations including said circuit and having the control right detects trouble on said transmission lines, transmits check signals simultaneously to other stations through one transmission line on which the trouble is detected;
   a circuit for receiving said check signals from other stations;
   a circuit for transmitting a response signal to a next transmission station at the side from which said check signal has been transmitted when said check signal is received;
   a circuit for receiving said response signal from other stations; and
   a switching control circuit for connecting said two transmission lines to close the loop at the station which did not receive the response signal.

2. A transmission control apparatus as set forth in claim 1, wherein said circuit which transmits said check signals and said circuit for receiving said response signal are connected to each of said two transmission lines respectively.

3. A transmission control apparatus as set forth in claim 1, wherein said circuit for receiving said check signals and said circuit for transmitting said response signal are connected to each of said two transmission lines respectively.

4. A transmission control apparatus in a duplex loop type transmission system in which a plurality of transmission stations are loop-connected with two transmission lines and a control right for transmission is passed among each of said transmission stations, comprising:
   a circuit which, when one of said stations including said circuit and having the control right detects trouble on one of said transmission lines, simultaneously transmits switching control commands for making said transmission lines in a straight condition to other stations through another transmission line on which the trouble is not detected and for transmitting check signals simultaneously to other stations through each of said transmission lines;
   a circuit for receiving said switching control commands for making the transmission lines in the straight condition at other stations;
   means for detecting trouble on said another transmission line;
   a circuit for receiving said check signals from other stations;
   a circuit for transmitting a response signal to a next transmission station at the side from which said check signals have been transmitted when said check signals are received;
   a circuit for receiving said response signal from other stations; and
   a switching control circuit for connecting said two transmission lines to close the loop at the station which did not receive the response signal.

5. A transmission control apparatus as set forth in claim 4, wherein said circuit for transmitting said check signals and said circuit for receiving said response signal are connected to each of said two transmission lines respectively.

6. A transmission control apparatus as set forth in claim 4, wherein said circuit for receiving said check signals and said circuit for transmitting said response signal are connected to each of said two transmission lines respectively.

7. A transmission control apparatus in a duplex loop type transmission system in which a plurality of transmission stations are loop-connected with two transmission lines and a control right for transmission is passed among each of said stations, comprising:

trouble control circuit means, responsive to one of the stations having the control right, for simultaneously delivering system switching commands to other stations through delivery circuits and switching circuits, and simultaneously delivering check signals for adjacent stations to the transmission lines through other delivery circuits and the switching circuits, and in response to said one of the stations having no control right, for delivering the commands to a switching control circuit from the transmission lines through receiver circuits, said check signals being received by the trouble control circuit means from the transmission lines through other receiver circuits.

8. The apparatus of claim 7, wherein the trouble control circuit receiving the check signals outputs a response signal to the transmission lines through further delivery circuits and the switching circuits.

9. A transmission control apparatus in a duplex loop type transmission system in which a plurality of transmission stations are loop-connected with transmission lines and a control right for transmission is passed among each of said stations, comprising:

control circuit means at a first one of said stations detecting trouble regarding one of the transmission lines, and sending to a trouble control circuit, a trouble clearing demand commanding inspection of the other of the transmission lines, said trouble control circuit at said one station receiving said trouble clearing demand and delivering to said other of said transmission lines, via a delivery circuit and a switching circuit, a simultaneous switching command, whereby others of said stations simultaneously receive the command by a switching control circuit through a receiver circuit and close other switching circuits, said trouble control providing a test data sending signal to the control circuit means for delivery of a reception confirming signal to said trouble control circuit.

10. The apparatus of claim 9, wherein the trouble control circuit receives the trouble clearing demand and delivers simultaneous adjacent station check signals to the one transmission line through another delivery circuit and another switching circuit.

11. The apparatus of claim 10, wherein the trouble control circuit, at second and third ones of said stations each deliver a response signal to the other of the transmission lines through a further delivery circuit and said switching circuit.

12. The apparatus of claim 11, including:

a fourth one of said stations receiving no check signal of said one transmission line, whereby said third station receives no response signal and said fourth station is put into a loopback condition.

* * * * *